(12) United States Patent
Negishi et al.

(10) Patent No.: US 6,493,312 B1
(45) Date of Patent: Dec. 10, 2002

(54) OPTICAL INFORMATION MEDIUM

(75) Inventors: Ryou Negishi, Tokyo (JP); Toshiaki Tajima, Tokyo (JP); Toru Fujii, Tokyo (JP); Emiko Hamada, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/351,845

(22) Filed: Jul. 13, 1999

(30) Foreign Application Priority Data

Jul. 23, 1998 (JP) ............................................ 10-207960

(51) Int. Cl.⁷ ................................................. G11B 7/24
(52) U.S. Cl. ................................. 369/275.4; 369/53.11; 369/53.2
(58) Field of Search ........................... 369/275.4, 275.3, 369/275.1, 13, 275.2, 277, 274, 276, 53.11, 53.2, 111; 428/64.1, 64.2, 64.4

(56) References Cited

U.S. PATENT DOCUMENTS

| 5,040,165 | A |   | 8/1991  | Taii et al.      |         |
|-----------|---|---|---------|------------------|---------|
| 5,696,758 | A | * | 12/1997 | Yanagimachi et al. | 369/275.4 |
| 5,896,367 | A | * | 4/1999  | Tsuchiya et al.  | 369/275.4 |
| 5,901,123 | A | * | 5/1999  | Taniguchi et al. | 369/47  |
| 5,904,969 | A | * | 5/1999  | Kamezaki et al.  | 428/64.1 |
| 6,016,302 | A | * | 1/2000  | Yamatsu et al.   | 369/275.4 |
| 6,118,752 | A | * | 9/2000  | Miyagawa et al.  | 369/275.3 |
| 6,307,824 | B1| * | 10/2001 | Kuroda et al.    | 369/53.11 |

FOREIGN PATENT DOCUMENTS

| EP | 0 467 716 A2 | 1/1992  |
|----|--------------|---------|
| EP | 0 762 392 A2 | 3/1997  |
| JP | 63-13144     | 1/1988  |
| JP | 4-146537     | 5/1992  |
| JP | 9-326138     | 12/1997 |
| JP | 10-154332    | 6/1998  |

* cited by examiner

*Primary Examiner*—Ali Neyzari
(74) *Attorney, Agent, or Firm*—Flynn, Thiel, Boutell & Tanis, P.C.

(57) ABSTRACT

An optical information medium is made up of a transparent substrate for a reproducing laser beam to penetrate therethrough, a recording layer formed on the transparent substrate and a reflective layer for reflecting the reproducing laser beam thereupon, thereby enabling the recording of optically readable signals by a recording laser beam incident upon the transparent substrate. This optical information medium has a spiral-like tracking guide on a side surface of the transparent substrate, on which the recording layer is formed, and on lands defined between the spiral-like tracking guide are formed land pre pits indicative of the sector information, including the address and so on, wherein the length of the land pre pits is selected to be from 50% to 83% of the length of the minimum pit and to be from 1.5 to 2.5 times the length of the channel clock. Also, the film thickness of the recording layer in the area of the land pre pits is selected to differ from the film thickness of the recording layer in the area of the tracking guide.

4 Claims, 5 Drawing Sheets

OPTICAL INFORMATION MEDIUM

BACKGROUND OF THE INVENTION

1. Field of the invention

The present invention relates to an optical information medium, on which can be recorded information which is optically reproducible, and in particular relates to an optical information medium having a sector information detector means suitable for a high density recording medium on which the information can be recorded and reproduced with a short wavelength of from 630 nm to 670 nm.

2. Description of Related Art

With the recent advances in development and application of a short wavelength laser, standardization has proceeded on a standard for DVDs (Digital Versatile Discs) which enables recording and reproducing at a high density, as well as the practical application thereof. On the DVD is provided a data area at least on one surface thereof, in which pits are formed as a means for recorded information, and a reflection layer made of metal film is formed on the data area.

For the DVDs mentioned above, a different standard for high density is determined, compared to the standard for the optical information medium being most general or popular now, such as a CD (Compact Disc). For example, with the optical pickup, it is determined to use a short wavelength of from 630 nm to 670 nm, and to use an objective lens of a high numeral aperture, such as of 0.6 in NA, etc. Accompanying this, for dealing with a tilt of the disc, the thickness thereof is determined to be 0.6 mm, about half (½) of that of the CD. However, for maintaining compatibility or interchangability in sizes between the CD having thickness of 1.2 mm, the disc of the DVDs have such a structure that two pieces of discs are filled up and pasted together. According to the DVD standard, it is standardized that one piece of the disc has a recording capacity of 4.7 GB at the maximum, in average thereof, i.e., video and audio information for a maximum 133 minutes long.

In the standardization process of the DVD standard, in the similar manner of the relationship between the CD-ROM and CD-R or CD-RW, at the beginning were assumed or expected to be standardized both an optical information medium for use or reproduction exclusively (for read-only) and an optical information medium which is recordable. However, the standardization at the beginning was made only on a DVD Video for video and on a DVD for reproduction only, such as a DVD-ROM which is targeted for recording computer data, but the standardization on the recordable DVD was postponed.

Heretofore, on the recordable CD, such as the CD-R, an address information called "ATIP (Absolute Time in Pregroove)" is obtained through FM modulation of wobbles of a tracking guide which is formed in spiral and groove-like shapes. In contrast to this, on the recordable DVD, such as the DVD-R, in place of the ATIP, sector information, including the address information indicative of the position on the optical information medium, can be obtained through land pre pits which are provided in advance on land portions defined between the tracking guides together with the wobbles.

Such land pre pits, which are applied into the high density recording medium as mentioned above, are readout by means of an optical pickup together with the pits of the recorded signals, however, since the optical pickup is guided along the tracking guide by a tracking servo system under a normal condition, the land pre pits and the pits formed on the groove for recording data signals are separately readout by discriminating them to each other. However, depending upon the shape of the land pre pits, there is a possibility that the land pre pits are erroneously readout by being mistaken for the pits for recording of the data signals.

Then, it comes to be a cause of occurring errors in the readout of the data signals. In contrast to this, there is also a possibility that the land pre pits cannot be readout correctly depending upon the shape of the land pre pits, then it causes generation of errors in the sector information including the address and so on, thereby making the reproduction operation unstable.

SUMMARY OF THE INVENTION

Accordingly, an object is, in accordance with the present invention, for solving the drawback(s) mentioned above, i.e., the problem in the readout of the land pre pits for picking up the sector information on the optical information medium corresponding to the high density recording mentioned above, to provide an optical information medium, with which the data signals and the sector information can be readout with discrimination between them correctly, by removing the errors in the readout of the land pre pits indicative of the sector information and of the pits indicative of the data signals on the tracking guide when reading the high density signals optically.

For achieving the object mentioned above, according to the present invention, an optically clear difference is given between the land pre pits 6 indicative of the sector information provided on the land 8 and the pits indicative of the data signals provided on the tracking guide 3, thereby preventing the erroneous reading of mixing them up with each other. In more detail, the difference is in the lengths of the pits, and in the optical path length of a reproducing light beam incident upon from the optical pickup.

Namely, according to the present invention, there is provided an optical information medium, comprising:

a transparent substrate 1 for a reproducing laser beam to penetrate therethrough;

a recording layer 12 formed on said transparent substrate; and a reflective layer 13 for reflecting the reproducing laser beam thereupon, thereby enabling the recording of the optically readable signals by means of a recording laser beam incident upon said transparent substrate 1. This optical information medium has a spiral-like tracking guide 3 on a side surface of said transparent substrate 1, on which said recording layer 12 is formed, and on lands 8 defined between the spiral-like tracking guide 3 are formed land pre pits 6 indicative of the sector information, including the address and so on, wherein the length of the land pre pits 6 is selected to be different from the lengths of the data pits.

On such an optical information medium, in which the length of the land pre pits 6 is different from that of the data pits, the signal obtained from the data pits formed on the tracking guide 3 can be discriminated from the signals obtained from the land pre pits 6, with ease. With this, there is no chance to readout the pits for recording the data signals, erroneously, in place of the pits for recording the sector information, thereby enabling the reduction of the reading errors of the data signals as well as the reading errors of the sector information.

For example, in the DVDs, the data pits lengths were from approximately 0.4 μm to approximately 1.9 μm.

Accordingly, the length of the land pre pits 6 is selected to be shorter than 0.4 μm, or alternatively to be the length exceeding 1.9 μm. However, it is unrealistic to make the length of the land pre pits exceed 1.9 μm, therefore it is preferable to select it to be shorter than 0.4 μm.

In this instance, it is preferable to shorten the length of the land pre pits 6 as much as possible up to the length of the minimum data pit. However, if the length of the land pre pits 6 is too small in length, it becomes difficult to readout the sector information from the land pre pits 6. On the other hand, when the length of the land pre pits 6 becomes near the length of the minimum data pits, discrimination cannot be performed easily between the land pre pits 6 and the data pits by the pit length. Then, the length of the land pre pits 6 is selected to be from 50% to 83% of the length of the minimum data pit. For example, the length of the minimum data pits is 3 times as long as a channel clock in the DVD, therefore, the length of the land pre pits 6 is selected to be from 1.5 to 2.5 times the length of the channel clock.

Further, in the optical information medium according to the present invention, the optical path length for the reproduction laser beam from the incident surface thereof upon the transparent substrate 1 up to the reflection layer in the area of the land pre pits 6 is selected to be different from the optical path length for the reproduction laser beam from the incident surface thereof upon the transparent substrate 1 up to the reflection layer in the area of the tracking guide 3. In more detail, the film thickness of the recording layer 12 in the area of the land pre pits 6 is selected to be different from the film thickness of the recording layer 12 in the area of the tracking guide 3.

Further in more detail, an absolute value of the difference, between the film thickness of the recording layer 12 in the area of the land pre pits 6 and the film thickness of the recording layer 12 in the area of the tracking guide 3, is selected to be from $\lambda/200$ to $\lambda/12$. Namely, an effectively adjustable range in the length of the optical path length is from approximately 10 nm, for example, when the wavelength of the laser beam is 635 nm. Here, in particular in the DVD-R, since dye is used as the recording layer, the effect of an optical constant n of the recording layer gives influence upon the length of the optical path. For instance, the optical constant n of the dye layer is 3.0, it is enough for the film thickness of the recording layer to be 10.0/3.0=3.333 nm, and this can be converted to 635/3.333 =200 in the wavelength of 635 nm, i.e., it is apparent the film thickness has an effective function for adjusting the length of the optical path if it has a difference equal or greater than $\lambda/200$.

Further, in a case of detecting the land pre pit signals by a single beam in accordance with a push-pull method, the adjustable range is within $\lambda/8$. However, also of the effect of the optical constant n of the recording layer made of the dye layer, the film thickness of the actual recording layer comes to be a value smaller than that. Namely, in a case where the optical constant n of the dye layer is 1.6, $\lambda/8$ is $(\lambda/8)/1.6 = \lambda/12.8$, i.e., it is apparent that the adjustment is possible in the length of the optical path all over the range if it has $\lambda/12$ substantially in the film thickness thereof.

In such an optical information medium, since the length of the optical path for the reproducing laser beam from the incident surface of the transparent substrate 1 differs between the areas where the land pre pits 6 and the tracking guide 3 are formed, respectively, and since it is possible to obtain a signal amplitude larger than that due to the physical difference of the land pre pits 6 formed on the transparent substrate 1, it is possible to detect the land pre pits 6 with ease.

Since no land exists only in that portion, i.e., in the portion of the land pre pits 6, substantially it is in such a condition that the tracking guide 3 is widen in width in a radial direction thereof. Therefore, when spin coating the dye material for forming the recording layer 12 on the transparent substrate 1, the leveling of the film thickness of the recording layer 12 is changed in the area of the land pre pits 6, and in particular, the film thickness Tg is changed compared to other portions of the tracking guide 3.

Also, the land pre pits 6 are formed in the transparent substrate 1 of the optical disk by a molding process and in that instance the protruding rims 7 are formed between the land pre pits 6 and the tracking guide 3 neighboring to both sides thereof, being lower than the depth of the tracking guide 3. This rim 7 gives influences upon the leveling of the recording layer 12 in the area of the land pre pits 6, in particular, when spin coating the dye material for forming the recording layer 12 on the transparent substrate 1, and it also gives influences on differences in the film thickness. Namely, if there exists the protruding rim 7 mentioned above, a resistance is changed in fluidity of the material for forming the recording layer, thereby changing the film thickness of the recording layer 12 formed. Then, by using this rim 7 in a positive manner, it is possible to make the film thickness different between the recording layer 12 in the area of the land pre pit 6 and the recording layer 12 in the area of the tracking guide 3.

However, it is not necessary for this rim to exist in a middle portion of the land pre pit 6 in a radial direction of the optical information medium. Namely, the rim 7 can give the effects even when it is interrupted on the way.

According to the present invention, errors in reading the data signal and the sector information are diminished, therefore they can be readout discriminatorily with certainty, when optically recording and reproducing the signals onto and from the optical information medium by using the optical pickup corresponding to the high density recording. Therefore, it is possible not only to record but also to readout the data signals with stability and certainty as well.

DESCRIPTION OF THE PREFERRED EMBODIMENTS

Hereinafter, detailed description of the embodiments according to the present invention will be given by referring to the attached drawings.

Figure 1:
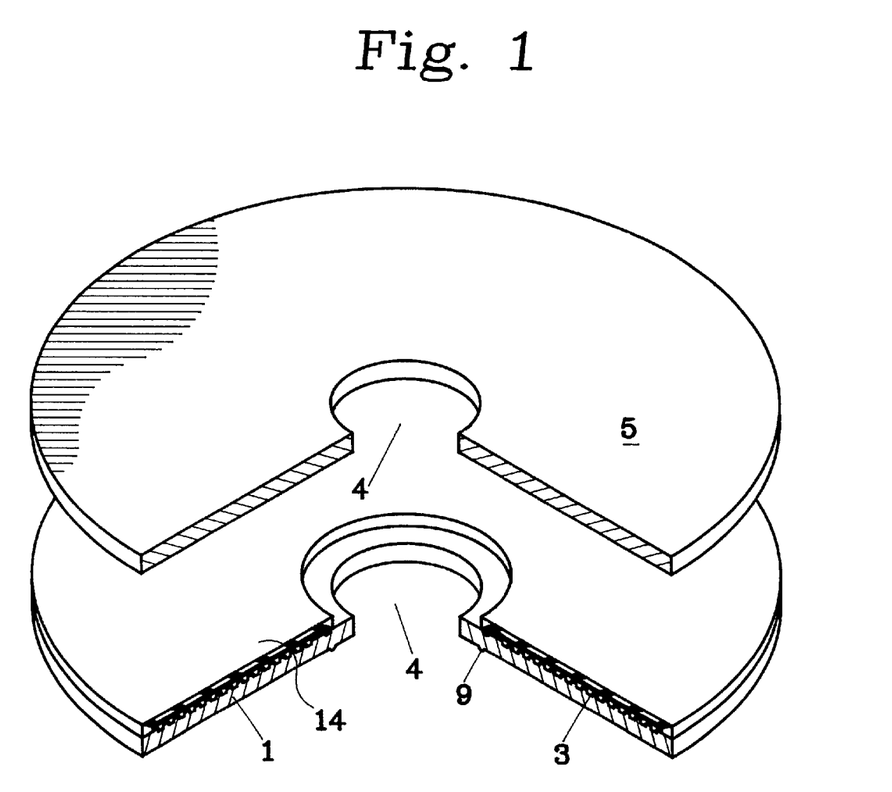
FIG. 1 is an exploded perspective view of two pieces of substrates in an example of an optical information medium according to the present invention, under a condition before they are bonded together, including a partial cross-section view thereof.
Figure 2:
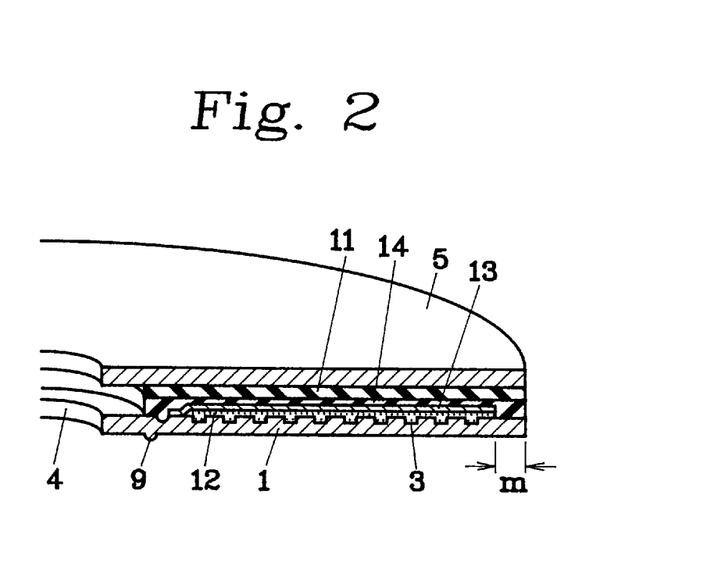
FIG. 2 is a perspective view including a vertical cross-section view of a portion of the same optical information medium.

A write once optical information medium, as an example of the optical information medium according to the present invention, is shown in FIGS. 1 and 2, which is pasted together on both surfaces and is recordable and reproducible from one surface thereof.

A transparent substrate 1 is made from a substrate in a disc-like shape, having a center hole 4 in the central portion thereof. This transparent substrate 1 is most preferably made of a transparent resin, such as polycarbonate, polymethyl methacrylate (PMMA), etc.

On the one surface of the substrate 1 having the transparency, and in the outside of the above-mentioned center hole 4, there is provided a clamping area which will be mentioned later, and in the outside thereof is formed a data area. In the data area of the transparent substrate 1 is formed a spiral-like groove 3 for tracking. The pitch of the groove 3 for tracking is 0.74 µm as the standard.

Figure 3:
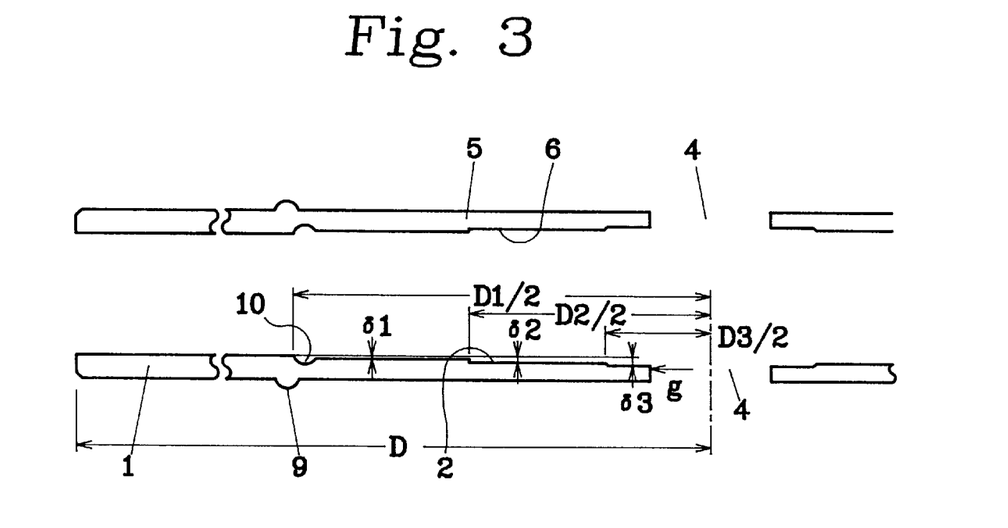
FIG. 3 is a vertical side cross-section view of a principle portion, in particular the cross-section view of an inner periphery of the transparent substrate which is used in the same optical information medium according to the present invention.

An example in the shape of the cross-section of an inner peripheral portion of the transparent substrate 1 is shown in FIG. 3, mainly of the portion near to the center hole 4 thereof. In this FIG. 3, by an arrow in indicated the position of a gate g where the resin material flows into a cavity when molding the transparent substrate 1 by means of an injection molding method, and this gate g is formed on the side of the center hole 4 of the transparent substrate 1, i.e., on the inner periphery side thereof.

As shown in this FIG. 3, a recessed gutter 10 in a ring-like shape is provided in the vicinity of a diameter D1 on the inner periphery side, near to the center hole 4 of the transparent substrate 1, and this portion is set in the inner side than the recording area where a step-like portion 2 is formed. In the inner periphery side from this diameter D1 is formed the step-like portion, thinner by δ 1 than the main surface of the transparent substrate 1. In the inner periphery side of the diameter D2, being inside the diameter D1, there is formed a step-like portion, thinner by δ 2 than the main surface of the transparent substrate 1. Further, in the area from the diameter D3 being inside the diameter D2 to the center hole, there is formed a step-like portion, thinner by δ 3 than the main surface of the transparent substrate 1.

In more detail, it is most suitable that the sizes of those diameters D1 to D3 an d the step-like portions δ 1 to δ 3 are selected as below.

D1=ø 33 mm ø 36 mm, and δ 1=0.02 mm 0.04 mm

D2=ø 25 mm ø 26 mm, and δ 2=0.04 mm 0.08 mm

D3=ø 15 mm ø 17 mm, and δ 3=0.10 mm 0.15 mm

With this transparent substrate, it is possible to make the resin uniform in density thereof when being molded with the injection mold method, thereby obtaining a transparent substrate having a low double refraction index (or birefringence refraction index) and a small tilt thereof. With this, s table recording and reproducing can be achieved onto and from the transparent substrate, being as thin as 0.6 mm in thickness thereof, even when adopting an optical pickup which uses a short wave length laser of a wave length from 630 nm to 670 nm and an objective lens of large NA (numerical aperture), such as of 0.6.

Figure 4:
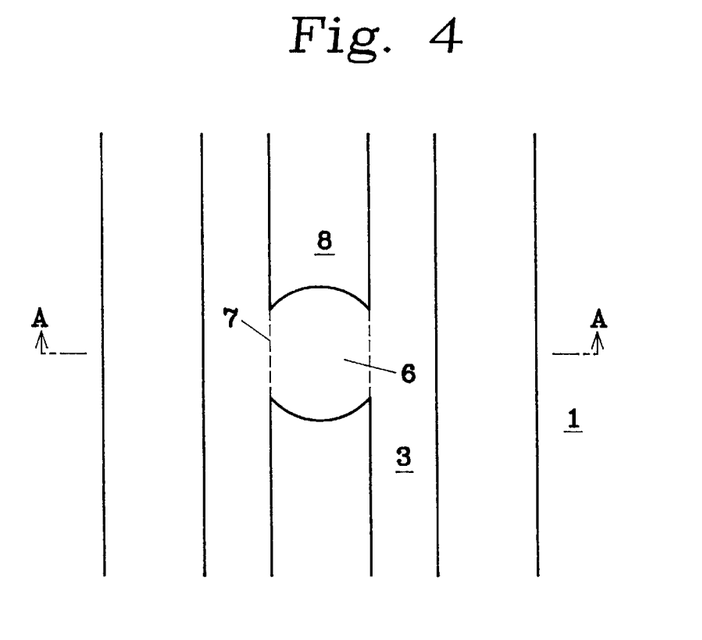
FIG. 4 is a plain view of the principle portion of the transparent substrate which is used in the same optical information medium according to the present invention.
Figure 5:
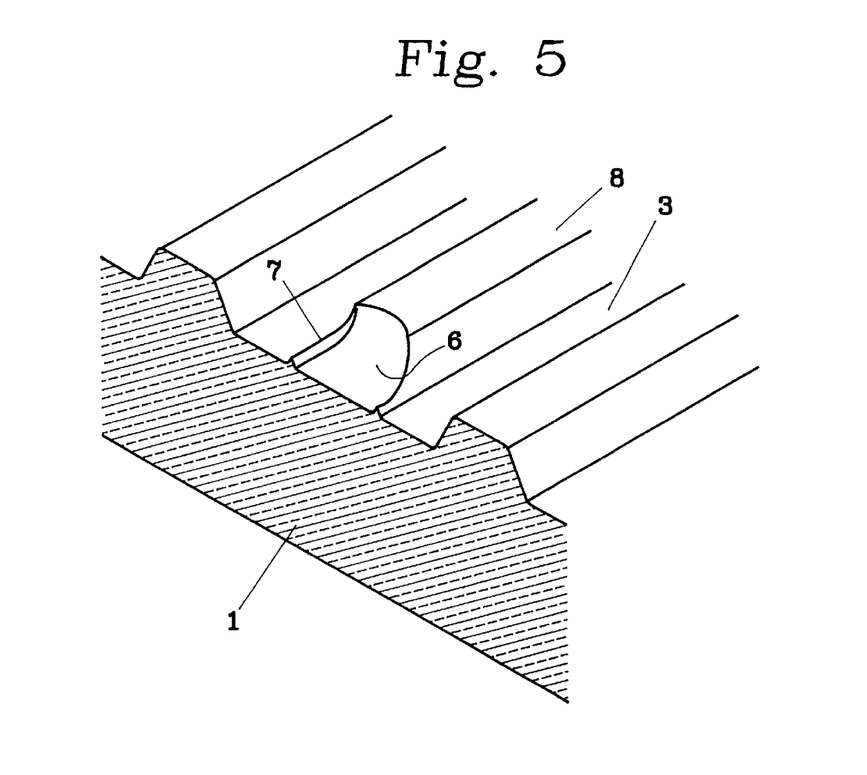
FIG. 5 is a perspective view of the transparent substrate showing the cross-section of AA portion in FIG. 4.

As shown in FIGS. 4 and 5, on the land 8 defined between the tracking guides 3 mentioned above is formed the land pre pit 6 indicative of the sector information, including the address information on the optical information medium, in a recess-like shape, at an appropriate distance therebetween. This land pre pit 6 is formed in advance with the tracking guide 3 mentioned above, when the transparent substrate 1 is formed by the injection mold method.

The depth of the land pre pit 6 is the same as that of the tracking guide 3, however the protruding rim 7 may be formed between the land pre pit 6 and the tracking guide 3 at both sides thereof during the time of the above-mentioned forming thereof. Of course, the depth of the rim 7 is lower or shallower than the depths of the tracking guide 3 and the land pre pit 6, i.e., lower than the height of the land 8 from the bottom surface of the tracking guide 3. As mentioned previously, the rim 7 may be interrupted on the way thereof.

This rim 7 gives influences upon leveling of the recording layer 12 in the area of the land pre pit 6, when performing the spin coating of the dye material for forming the recording layer 12 on the transparent substrate 1, and in particular, it gives influences upon the difference in the film thickness thereof. Namely, the existence of the protrusion like rim 7 increases the resistance in fluidity of the recording material, therefore the film thickness of the recording layer 12 therebetween comes to be thick. Then, by using this rim 7, it is possible to make different film thicknesses of the recording layer 12 between the area of the land pre pit 6 and the area of the tracking guide 3.

The length of the land pre pit 6 is made different from that of the pits which are formed on the optical information medium when recording. For example, in the DVD, the data pits length were from approximately 0.4 µm to approximately 1.9 µm, however the length of the land pre pit 6 is selected to be shorter than 0.4 µm, which is equal to the shortest pit length. In more detail, the length of the land pre pit 6 is selected to be from 50% to 83% of the shortest pit length. For example, in the DVD, the shortest pit length is that for three (3) channel clocks, and the length of the land pre pit 6 is selected to be from 1.5 times to 2.5 times long as the length of the channel clock.

Though the land pre pit 6 mentioned above is for the purpose of obtaining the signal of the sector information for the optical information medium, it is also possible to obtain the address information through FM modulation of the wobble of the tracking guide 3, using at the same time the land pre pit 6, together.

Figure 6:
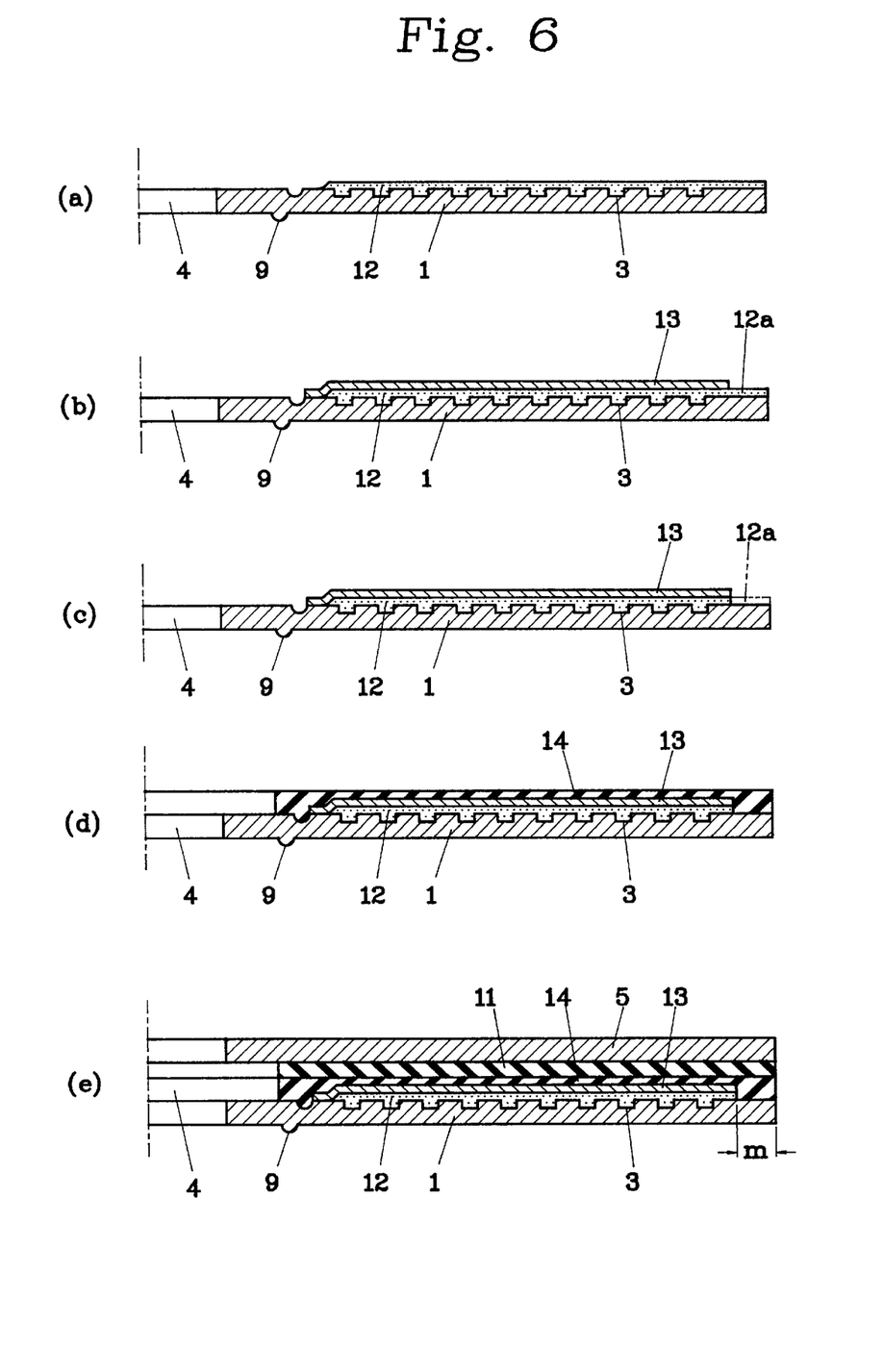
FIGS. 6(a) to (e) show cross-section views of the principle portion of the optical information medium, for showing steps of a manufacturing method of the same optical information medium.

As shown in FIG. 6(a), the recording layer 12 is formed in the portion of the signal recording area on the main surface of the transparent substrate 1 mentioned above. For example, organic dye or the like is applied or coated upon the portion of the outer periphery side, being outside of the signal recording area of the transparent substrate 1, by means of the spin coating method, so as to form the recording layer 12. As is shown in FIG. 6(a), the recording layer 12 formed by the spin coat method is formed up to the edge on the outer periphery of the transparent substrate 1.

Next, on the recording layer 12 is formed a reflection film 13 made of a metal film of gold, aluminum, silver, copper or an alloy thereof. For example, the reflection layer 13 is formed by means of a spattering method, or a vacuum evaporation method, under the condition that a mask not shown in the figure is disposed on the transparent substrate 1 so as to restrict areas in concentric ring-like shapes where the reflection layer 13 is to be formed therein. This reflection layer 13 is formed concentrically with the recording layer 12 mentioned above, however the inner diameter thereof is smaller than that of the recording layer 12, and the outer diameter thereof is smaller than that of the outer diameter of the transparent substrate 1. Accordingly, as shown in FIG. 6(b), the reflection layer 13 is formed so as to cover the edge of the inner periphery of the recording layer 12, completely, however the outer periphery portion 12a of the recording layer 12 is exposed out of the reflection layer 13 in the outer periphery portion of the transparent substrate 1. The area of the outer periphery portion 12a of the recording layer 12 exposed out of the reflection layer 13 is equal to a margin m which will be mentioned latter.

Next, as shown in FIG. 6(c), by using the reflection layer 13 in place of the mask, the outer periphery portion 12a of the recording layer 12 exposed from the outer periphery edge thereof is removed. For example, by cleaning the outer periphery portion of the transparent substrate 1 by a solvent for dissolving the recording layer 12, only the outer periphery portion 12a of the recording layer 12 exposed out of the reflection layer 13 is removed. With this, the recording layer 12 coincides with the reflection layer 13 at the outer peripheral edge thereof.

In this manner, by removing the outer periphery portion 12a of the recording layer 12 exposed out of the external peripheral edge of the reflection layer 13 after forming the reflection layer 13 smaller than the outer diameter of the transparent substrate 1, the reflection layer 13 performs the function as the mask for removing the outer periphery portion 12a of the recording layer 12, thereby enabling the removal of the outer periphery portion 12a of the recording layer 12 in such manner that the reflection layer 13 and the recording layer 12 are almost coincident with each other at the outer periphery portions thereof. It is also possible to form the portion of the margin m where no recording layer 12 nor reflection layer 13 is formed on the transparent substrate 1, with ease. Since it is also possible to remove the recording layer 12 along with the edge of the reflection layer 13 formed concentrically with the transparent substrate 1 with accuracy, an optical information medium can be obtained, with which no inclination occurs in the center of gravity of the optical information medium, thereby obtaining an optical information medium showing a good character, in particular, in disc unbalance thereof.

Next, as shown in FIG. 6(d), a protection layer 14 of a reactive curable resin, such as an ultraviolet ray curable resin, for example, is formed on the recording layer 12 and the reflection layer 13, so as to cover them. For example, the ultraviolet ray curable resin is dropped on it while turning the transparent substrate 1, at the inner periphery side thereof, so as to spread the resin radially on the transparent substrate 1 by means of centrifugal force thereby, and after this spin coating, ultraviolet rays are irradiated on it. As is mentioned previously, since the reflection layer 13 is formed to cover the inner periphery edge of the recording layer 12, completely, the solvent of the resin will not soak into between the reflection layer 13 and the transparent substrate 1 when the resin for forming the protection layer 14 is spin coated thereby, thereby preventing the recording layer 12 laying therebetween from being dissolved into and deteriorated by invasion thereof.

Further, as shown in FIG. 1, another one (1) piece of a substrate 5 is prepared other than the transparent substrate 1. This substrate 5 is made of the same material as that of the transparent substrate 1 mentioned above, as well as in the same sizes thereof, however there is not provided the groove 3, the recording layer 12 and the reflection layer 13 as provided in the transparent substrate 1, on the main surface thereof. Of course, it is possible to provide the other substrate 5 with the groove 3, the recording layer 12 and the reflection layer 13, and the protection layer 14, in the same manner as in the transparent substrate 1 mentioned above.

Next, as is shown in FIG. 2 and FIG. 6(e), those two pieces of the substrates 1 and 5 are bonded together. For example, by means of the spin coat method or a screen printing method, a reactive curable resin such as an ultraviolet ray curable resin, for example, is applied on a main surface of at least one of the two (2) pieces of the substrates 1 and 5, and further they are pasted together with those surfaces opposing each other and then the reactive curable resin is cured. In this manner, with the adhesion layer 11 being formed by curing the reactive curable resin, the two (2) pieces of the substrates 1 and 5 are pasted together at the main surfaces opposing each other. In this instance, the transparent substrate 1 is pasted on the surface on which the recording layer 12 and the reflection layer 13 are formed.

As shown in FIG. 6(e), there is provided the margin m on the outer periphery portion of the transparent substrate 1, in which no recording layer 12 nor reflection layer 13 is provided, and in this margin m, there lies no recording layer 12 nor reflection layer 13 between the transparent substrate 1 and the other substrate 5, therefore, those substrates 1 and 5 are adhered to each other only through the protection layer 14. This margin m is preferably provided at a width equal or greater than 1 mm bridging from the outer periphery to the inner periphery side of the transparent substrate 1.

With the optical information medium as mentioned above, since the outer periphery portion of the transparent substrate 1 is adhered with the other substrate 5 only through the protection layer 14 but not through the recording layer 12, in the portion of the margin m on the outer periphery of the transparent substrate 1, bonding strength between the transparent substrate 1 and the other substrate 5 in the outer periphery portion thereof can be strengthened. In particular, the bonding strength is reinforced greatly in the outer peripheral portion between the substrates 1 and 5 of the optical information medium, where it is most likely to receive shocks from falling down thereof, therefore the strength against the shocks of the optical information medium can be increased greatly.

Figure 7:
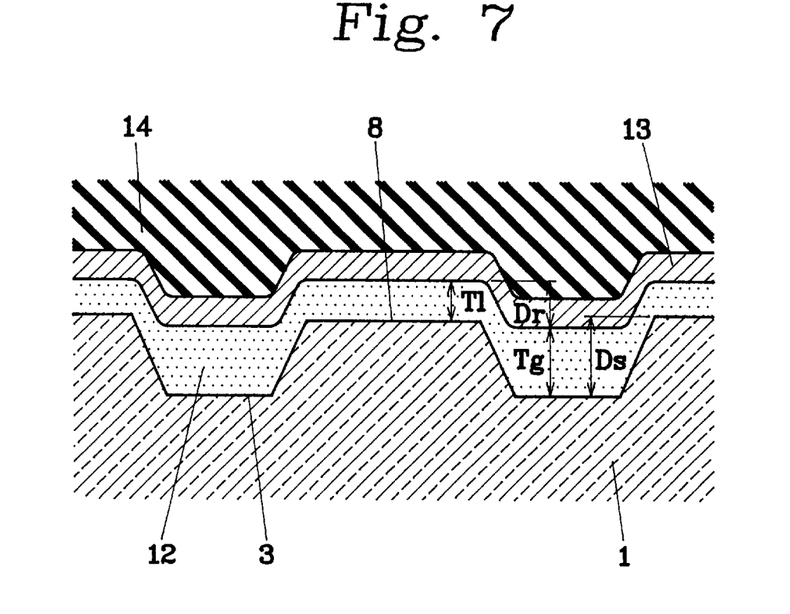
FIG. 7 shows a vertical cross-section view of the principle portion of the same optical information medium, in particular in a recording area thereof where no land pre pit is formed.
Figure 8:
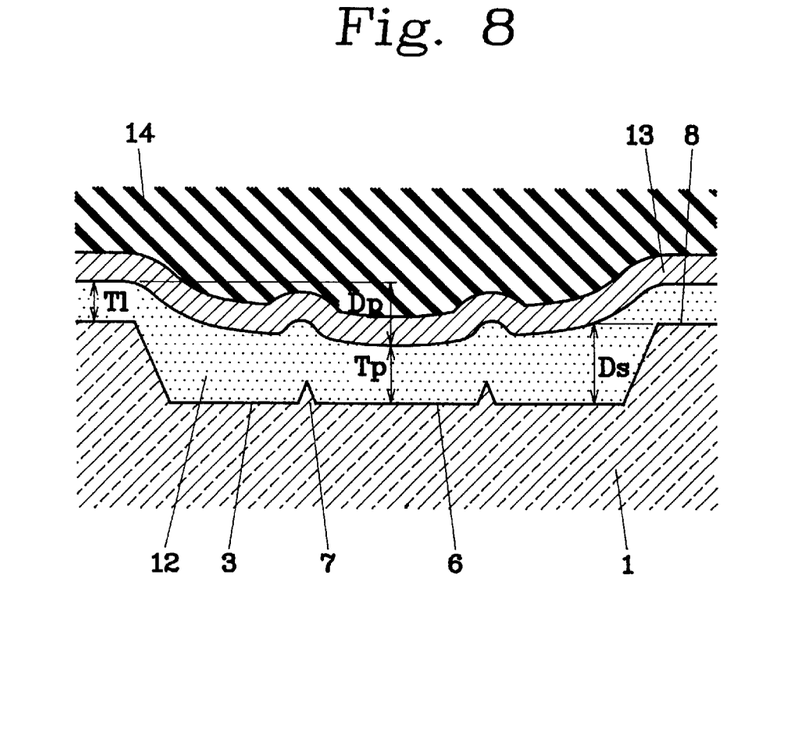
FIG. 8 shows a vertical cross-section view of the principle portion of the same optical information medium, in particular in the recording area thereof, but where the land pre pit is formed.

FIGS. 7 and 8 show examples of the condition of forming the recording layer 12 in the portion where no land pre pit 6 is formed and in the portion where the land pre pit 6 is formed, respectively, and any one of them shows the cross-section view in the radial direction of the transparent substrate 1.

As is apparent from comparison between FIGS. 7 and 8, since no land 8 exists only in the portion of the land pre pit 6 shown in FIG. 8, it is the same in the condition that substantially the width of the tracking guide 3 is widened in the radial direction of the optical information medium, compared to the portion where no land pre pit 6 is formed as shown in FIG. 7. Therefore, when forming the recording layer 12 on the transparent substrate 1 by the spin coating of the dye material, the leveling of the film of the recording layer 12 is decreased down in the area of the land pre pit 6, and then the film thickness Tp of the recording layer 12 in the portion of the land pre pit 6 comes to be thinner than the film thickness Tg of the recording layer 12 in the portion of the tracking guide 3 where no land pre pit 6 is formed.

As shown in FIGS. 7 and 8, when assuming that the depth of groove of the tracking guide 3 is Ds, that the film thickness of the recording layer 12 in a portion of the land is 8 Tl, that the depth of groove of the recording layer 12 in a portion of the tracking guide 3 is Dr, and that the depth of groove of a portion of the land pre pit 6 is Dp, then the Tg and Tp mentioned above can be expressed by the following equations:

$$Tg=Ds+Tl=Dr$$

$$Tp=Ds+Tl-Dp$$

Accordingly, the difference Tg—Tp can be expressed as follows:

$$Tg-Tp=Dp-Dr$$

Namely, the difference in the film thickness of the recording layer 12 in those portions can be expressed by the depth Dp of the groove of the recording layer 12 in the portion of the land pre pit 6, and the depth Dr of the groove of the recording layer 12 in the portion of the tracking guide 3.

Due to the difference between the film thickness Tg and Tp of the recording layer 12, there occurs a difference in the optical path length from the incident surface of the reproducing laser beam upon the transparent substrate 1 to the reflection layer, in the portions where the land pre pit 6 is provided and where no land pre pit 6 is provided. With this, a phase difference occurs in the reproducing laser beams in the area of the land pre pit 6, and then can be obtained a signal amplitude larger than that due to the difference in the physical size of the land pre pit 6 formed on the transparent substrate 1. Therefore, it is possible to detect the land pre pit, easily.

In the example mentioned above, on the transparent substrate 1 having the recording layer 12 and the reflection layer 13, on the surface of which is formed the tracking guide 3, is bonded the other substrate 5 not having the recording layer 12 or the reflection layer 13 thereon. In this instance, also the recording and/or reproducing is possible, but only on one side surface thereof. The other substrate 5 may have no transparency, or be colored for maintaining a durability against light, or have an area on the surface, where letters or patterns can be written in.

On the other hand, preparing two pieces of the transparent substrates 1, each having the recording layer 12 and the reflection layer 13 on the surface thereof, and formed with the groove 3, it is also possible to bond them together opposing the recording layer 12 and the reflection layer 13 to each other, so as to obtain an optical information medium, with which the recording and/or reproducing can be performed on both surfaces thereof.

However, in FIGS. 1 and 2, reference numeral 9 indicates a ring-like convex portion formed in an inside of the data recording area on the side surface of the transparent substrate 1, upon which the recording laser beam is incident. This is for the purpose of protecting the recording surface of the optical information medium from touching with the surface of the other one, for instance when the plurality of the optical information media are filled up.

Next, examples of the present invention will be explained by referring specific numerical values thereof.

EXAMPLE 1

A transparent substrate 1 having the tracking guide 3 on one side of the main surfaces, being 0.31 μm in half width, 140 nm in depth, and 0.74 μm in pitch, is prepared from a polycarbonate substrate of 120 mm ψ in outer diameter, 15 mm ψ in inner diameter, 0.597 mm in thickness, and 1.59 in refractive index. In a portion on the land 8 defined between the tracking guides 3 are formed a plurality of land pre pits 6, with a length of 0.25 μm in half width and dispersion of 0.02 μm.

On the side surface of the transparent substrate 1, having the tracking guide 3 thereon, the recording layer 12 with a film thickness of 60 nm is formed by spin coating a solution of trimethylene dye (cyanine dye). A rate of leveling in this instance is 0.3.

The difference Dp—Dr between the depth of grooves in the portion of the tracking guide 3 mentioned above and the depth in the portion of the land pre pit 8 is 15 nm.

Further, Au is spattered onto the recording layer 12 so as to form the reflection layer 13 therewith. On this, an ultraviolet ray curable resin (SD 211 of Dainippon Ink Chemical Industry Co., Ltd.) is coated by the spin coating and is hardened by irradiating the ultraviolet ray on it, so as to form the protection layer 14 therewith. On this protection layer 14, being applied with an adhesive of the ultraviolet ray curable resin, the substrate is bonded together, having the same material and sizes mentioned above. The ultraviolet ray is irradiated on the adhesive to harden it, thereby producing the optical information medium. On the optical information medium manufactured in this manner, the sector information is readout by using an optical pickup (being 0.6 in the NA) which emits a laser beam of wavelength 635 nm, and then the address information can be readout with stability. By using the same system, 8 16 modulation signals (converting 8 bits into 16 bits) are recorded at recording power of 10 mW. When trying to reproduce the optical information medium by means of the DVD player, reading errors are small in the number thereof, and a stable reproduction can be achieved. The modulation factor of the recording signal is 61%, the maximum value of lengths errors between the pit and land is 6.0 nsec for each signal, and the jitter is 7.5%, respectively, therefore obtaining good or preferable results.

EXAMPLE 2

The optical information medium is manufactured, in the same manner as in the embodiment 1 mentioned above, but excepting that the land pre pit 6 is formed with a length of 0.28 μm in the half width and with a dispersion of 0.02 μm, and the difference Dp—Dr between the depth of grooves in the portion of the tracking guide 3 mentioned above and the depth in the portion of the land pre pit 8 is 20 nm.

On the optical information medium manufactured in this manner, the sector information is readout by using the optical pickup (being 0.6 in the NA) which emits a laser beam of wavelength 650 nm, and then the address information can be readout with stability. By using the same system, the 8 16 modulation signals (converting 8 bits into 16 bits) are recorded at a recording power of 11.5 mW. When trying to reproduce the optical information medium by means of a DVD player, reading errors are small in the number thereof, and then stable reproduction can be achieved. The modulation factor of the recorded signal is 65%, the maximum value of length errors between the pit and land is 5.8 nsec for each signal, and the jitter is 7.3%, respectively, therefore obtaining good or preferable results.

Comparison 1

The optical information medium is manufactured in the same manner as in Example 1 mentioned above, except that the land pre pit 6 is formed with a length of 0.40 μm in the half width and with a dispersion of 0.02 μm.

On the optical information medium produced in this manner, the sector information is readout by using the optical pickup (being 0.6 in the NA) which emits a laser beam of wavelength 635 nm, and then the address information can be readout with stability. By using the same system, the 8 16 modulation signals (converting 8 bits into 16 bits) are recorded at a recording power of 10.0 mW. However, when trying to reproduce the optical information medium by means of the DVD player, errors occur in reading the data signals. The modulation factor of the recorded signal is 65%, the maximum value of length errors between the pit and land is 6.5 nsec for each signal, and the jitter is 9%, respectively.

Comparison 2

The optical information medium is manufactured in the same manner as in Example 1 mentioned above, except that the land pre pit 6 is formed with a length of 0.15 μm in half width and with a dispersion of 0.02 μm. On the optical information medium produced in this manner, the sector information is attempted to be readout by using an optical pickup (being 0.6 in the NA) which emits a laser beam of wavelength 650 nm, but no sector information can be read out therefrom, nor could the recording be performed.

Comparison 3

The optical information medium is manufactured in the same manner as in Example 1 mentioned above, but except that the difference Dp—Dr between the depths of grooves in the portion of the tracking guide 3 mentioned above and in the portion of the land pre pit 8 is 1 nm.

On the optical information medium manufactured in this manner, the sector information is attempted to be readout by using an optical pickup (being 0.6 in the NA) which emits a laser beam of wavelength 635 nm, and then the address information can be readout with stability. By using the same system, the 8 16 modulation signals (converting 8 bits into 16 bits) are recorded at a recording power of 10.0 mW. However, when trying to reproduce the optional information medium by means of a DVD player, errors occur in reading the data signals. The modulation factor of the recorded signal is 62%, the maximum value of length errors between the pit and land is 6.3 nsec for each signal, and the jitter is 8.0%, respectively.

What is claimed is:

1. An optical information medium comprising:

a transparent substrate for allowing the penetration of a reproducing laser beam therethrough;

a spiral tracking guide provided on a surface of the transparent substrate, said transparent substrate having a land portion defined by said spiral tracking guide and a land pre pit for indicating sector information formed on the land portion;

a recording layer formed on the surface of the transparent substrate on which the spiral tracking guide is provided; and a reflective layer provided upon the recording layer for reflecting the reproducing laser beam and enabling the recording of optically readable signals by a laser beam incident thereon from said transparent substrate, wherein an optical path length for the reproducing laser beam from an incident surface of the transparent substrate to the reflective layer on said land pre pit differs from an optical path length for the reproducing laser beam from the incident surface of the transparent substrate to the reflective layer on said tracking guide, the film thickness of said recording layer on the land pre pit differs from the film thickness of said recording layer on said tracking guide, and the absolute value of the difference between the film thickness of said recording layer on said land pre pit and the film thickness of said recording layer on said tracking guide is from $\lambda/200$ to $\lambda/12$.

2. An optical information medium as described in claim 1, wherein a protruding rim is formed between said land pre pit and said tracking guide adjacent thereto and lower than the depth of said tracking guide.

3. An optical information medium comprising:

a transparent substrate for allowing the penetration of a reproducing laser beam therethrough;

a spiral tracking guide provided on a surface of the transparent substrate, said transparent substrate having a land portion defined by said spiral tracking guide and a land pre pit for indicating sector information formed on the land portion;

a recording layer formed on the surface of the transparent substrate on which the spiral tracking guide is provided; and a reflective layer provided upon the recording layer for reflecting the reproducing laser beam and enabling the recording of optically readable signals by a laser beam incident thereon from said transparent substrate, wherein an optical path length for the reproducing laser beam from an incident surface of the transparent substrate to the reflective layer on said land pre pit differs from an optical path length for the reproducing laser beam from the incident surface of the transparent substrate to the reflective layer on said tracking guide, the film thickness of said recording layer on the land pre pit differs from the film thickness of said recording layer on said tracking guide, and the absolute value of the difference, /Dp—Dr/, between the depth Dp of a groove of said recording layer in said land pre pit and a depth Dr of a groove of said recording layer in said tracking guide is from $\lambda/200$ to $\lambda/12$.

4. An optical information medium as described in claim 3, wherein a protruding rim is formed between said land pre pit and said tracking guide adjacent thereto and lower than the depth of said tracking guide.

* * * * *